United States Patent [19]

Philippe

[11] 4,337,595
[45] Jul. 6, 1982

[54] METHOD AND APPARATUS FOR PROTECTING EXTRACTS OBTAINED BY TAPPING TREES

[75] Inventor: Gerard G. Philippe, Jakarta, Indonesia

[73] Assignee: Carlier, Philippe & Melkye (H.K.) Limited, Hong Kong

[21] Appl. No.: 154,254

[22] Filed: May 29, 1980

[51] Int. Cl.³ .............................................. A01G 23/10
[52] U.S. Cl. ............................................ 47/10; 47/50
[58] Field of Search ...................................... 47/10–12, 47/24–25

[56] References Cited

U.S. PATENT DOCUMENTS 694,208  2/1902  Smith .................................. 47/24 X

FOREIGN PATENT DOCUMENTS

| 994791 | 11/1951 | France | 47/11 |
| 1041570 | 10/1953 | France | 47/11 |
| 650685 | 1/1963 | Italy | 47/10 |
| 657495 | 9/1951 | United Kingdom | 47/10 |
| 894411 | 4/1962 | United Kingdom | 47/11 |
| 1533807 | 11/1978 | United Kingdom | 47/10 |

*Primary Examiner*—Robert E. Bagwill
*Attorney, Agent, or Firm*—Sughrue, Mion, Zinn, Macpeak & Seas

[57] ABSTRACT

An apparatus for shielding the tapping cuts of rubber trees from rainwater is disclosed, which comprises an aluminum foil strip sufficiently malleable to conform to the pattern of the bark of the tree to which it is affixed. The foil strip is preferably pleated, folded or wrinkled so as to provide for sufficient elongation to accommodate both the perimeter of the bark and expansion in the girth of the tree. A method for preparing the foil strip and adhering it to the tree is also disclosed.

9 Claims, 4 Drawing Figures

METHOD AND APPARATUS FOR PROTECTING EXTRACTS OBTAINED BY TAPPING TREES

BACKGROUND OF THE INVENTION

1. Field of the Invention

The present invention is directed to a method and apparatus for protecting tree extracts obtained by tapping. More particularly, the present invention is directed to protecting the rubber latex from rain water during tapping of a rubber tree.

2. Description of the Prior Art

While the present invention is applicable to tapping trees in general, rubber growers have long recognized the need to protect their latex from rain water. The rubber latex is obtained by tapping a slit cut with a 30 degree slope to the horizontal on a half circumference of a rubber tree, generally of the genus Hevea. During rains and, particularly the rainy seasons which characterize many of the areas in which rubber trees thrive, rain water flows down the trunk of the rubber tree and is diverted into the latex by the tapping slit. In heavy or constant rains, this quantity of water can dilute the latex to such an extent that it is not practical to tap trees given reduced production and profitability. While the art has available numerous means of protecting the collection cup from rain water, none is as effective against the rain water which runs down the side of the tree or as inexpensive to supply and use as is that of the present invention. Consequently, there is a need for an effective and, in view of the large number of trees involved, an inexpensive means to protect the latex from rain during tapping.

U.S. Pat. Nos. 29,905; 313,397; 502,740; and 1,948,783 disclose tapping bucket and spout covers in which a platform large enough to extend beyond the collection bucket is fixed to the tree by various awkward mechanical constructions. In each instance the platform is apparently made of a fairly rigid material which is supported by one or more means which pierce the tree trunk. In comparison to the technique used in the present invention these devices have rather complicated constructions, are more expensive and are not capable of conforming to the contour of the tree. As a result they are not effective against rain water flowing down the trunk of the tree. Furthermore they are not convenient and they would be comparatively expensive to use. U.S. Pat. No. 1,040,900 discloses a turpentine apron which is a curved plate of sheet metal having serrated teeth on its inner edge. This plate is driven into the tree and there it functions as a gutter to collect the pine sap without providing any of the advantages of the present invention. In particular, it channels the rain water runnng down the tree into the collection cup as opposed to away from it and it is not as convenient to supply, store and use as is the device described below.

SUMMARY OF THE INVENTION

Accordingly, a principal object of the present invention is to provide a method for protecting the extracts obtained by tapping trees from rain water which is effective, inexpensive and which can be easily implemented.

Another object of the present invention is to provide a device which can be easily applied to the trunk of a tapped tree, which will divert rain water from the tap slit in that tree and which is inexpensive to use.

Another object of the present invention is to provide a device for protecting the extracts obtained by tapping trees, which can be cut to size at the tree site and which is capable of conforming to the rough contour of the tree and expanding to growth in its circumference.

These and other objects are attained in accordance with the present invention which provides a method for protecting the extracts obtained by tapping trees from rain water, wherein a strip of aluminum foil or similar material is secured to the trunk of the tree above the tapping slit so as to form a gutter which collects rain water and discharges it clear of the tapping slit, and which provides a strip of aluminum foil specially adapted for this purpose.

BRIEF DESCRIPTION OF THE DRAWINGS

The present invention will be described in detail by reference to the accompanying drawings wherein.

DETAILED DESCRIPTION OF THE INVENTION

Figure 1:
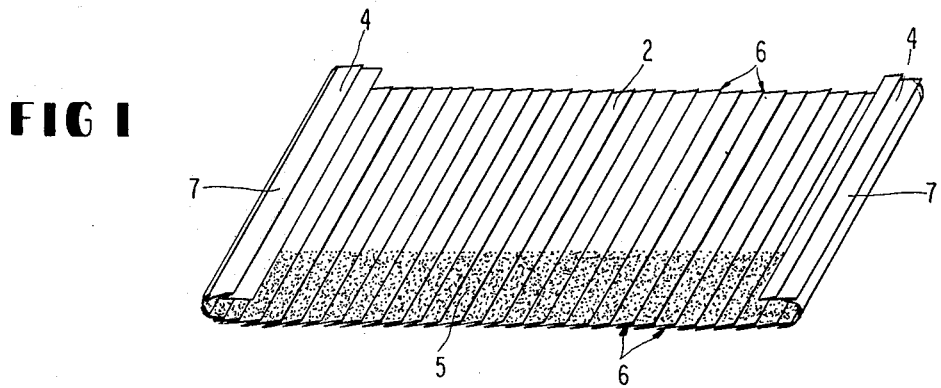
FIG. 1 is a view of a strip of aluminum foil which is pleated before application to the tree trunk.

While the description herein is directed primarily to protecting the rubber latex obtained by tapping trees of the genus Hevea, it will be apparent that the present invention is applicable to tapping any other trees which produce a useful product such as maple syrup or turpentine.

It has been found that with proper adaptations, aluminum foil is an ideal material for application to a tree trunk and diverting rain water flowing down the trunk away from a tapping slit cut in a tree. By its nature, aluminum foil can conform to the rough contour of the tree trunk and, when folds, wrinkles or pleats are formed therein, it can expand with any increase in the circumference of the tree. Other qualities of aluminum foil which make it ideal for this purpose are its softness and its impermeability to water. The product is also convenient to store and is inexpensive.

In accordance with the present invention, a strip of aluminum foil is pleated or wrinkled to give it the capacity to expand about 25 to 50% in length. This makes it easier to apply the foil within the grooves of the bark and conform to the exact contour of the tree. It allows the foil to be expanded to make a gutter for rain water diversion from the cut and expand to any growth in the circumference of the trunk. The foil is preferably a soft or medium-temper foil as opposed to a hard-temper foil because the soft or medium-temper foil is more malleable, conforms better to the rough bark of the tree and folded back, is easier to form the gutter. In areas of light rain, a foil thickness on the order of 0.0015 inch is suitable. In heavier rainy areas, thicknesses on the order of 0.002 inch are preferred.

The lower portion of one surface of the foil is coated with a pressure sensitive adhesive. Any conventional pressure-sensitive adhesive can be used for this purpose and an acrylic adhesive in particular has been found useful. Typically the lower portion up to about $\frac{1}{3}$ or $\frac{1}{2}$ of the backside of the foil will be coated to provide good adhesion and yet allow sufficient foil for forming a gutter to carry even the heaviest rain flows.

One of the advantages of using aluminum foil is that it can be wound in a roll and conveniently carried and stored. While the size of the gutters formed in accordance with the present invention may vary, aluminum foil strips about 1¾ inch wide are typical. To prevent the adhesive applied to one side of the foil from adhering to the other side of the foil as it is rolled, the latter side is preferably coated with a layer of an antiadhesive such as silicone to facilitate release from the foil side with adhesive. A release paper could be used and removed before application instead of an antiadhesive but the latter is preferred.

When applying the aluminum foil to the tree trunk in accordance with the present invention, the foil is adhered to the bark of the tree above the tapping cut. The bark preferably should be cleaned with a brush or in another suitable fashion. The lower portion of the aluminum strip is fixed to the tree trunk by the pressure sensitive adhesive on the lower edge thereof. Auxiliary fixing means such as drawing pins and the like may be used to fasten the lower portion of the strip ends and at various locations intermediate them, but they are not necessary in most cases.

When applying the strip of aluminum to the tree, care must be taken to insure that the foil matches all the hollows and swells in the trunk so as to obtain a good seal between the lower dege of the foil and the tree. This is facilitated in the present invention by the presence of wrinkles or pleats in the foil which give the foil a degree of extendability. Consistent with its purpose, the foil is preferably applied to the tree at a slight angle to the horizontal, typically on the order of 40°. The upper portion of the aluminum strip is then pulled back from the trunk of the tree to form the gutter. The bottom of the gutter may be additionally sealed by pouring a small amount of latex or other adhesive into the gutter.

An aluminum strip applied in accordance with the present invention is believed to be able to remain in place for up to the five-year period during which the half circumference of the tree is exploited for rubber. For maximum effectiveness the foil strip should be changed annually so that it is as close as possible above the tapping cut. The strip can be easily changed any time necessary, which is another of the advantages of the present invention.

Referring to FIG. 1, an aluminum strip constructed in accordance with the present invention comprises aluminum foil 2, having uniformly spaced pleats 6 therein. As an alternative embodiment, which could be even less expensive to manufacture, the foil can be laterally wrinkled in the fashion of a crepe paper to provide adequate extendability. The lower portion of the foil to be faced to the tree is coated with an adhesive 5, and the ends 4 may be folded back on themselves so as to give the gutter additional strength. Good stiffness is obtained when the ends are folded-over on themselves. The surface 7 opposite the adhesive may be coated with a layer of silicone.

Figure 2:
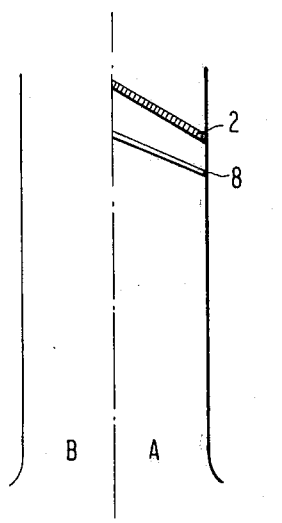
FIG. 2 is a diagrammatic perspective of a tree provided with the device of the present invention.
Figure 3:
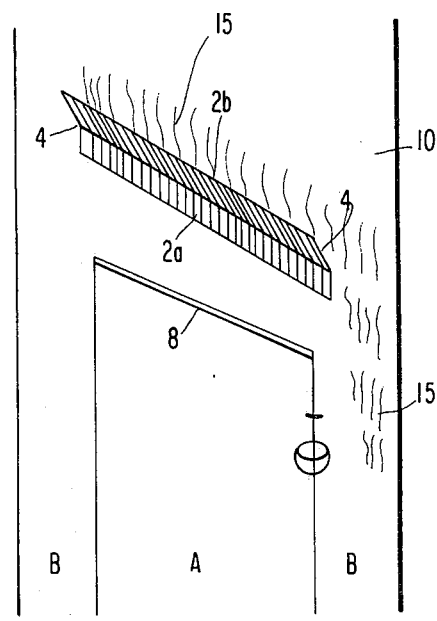
FIG. 3 is a diagram of the tree as if it were laid flat.
Figure 4:
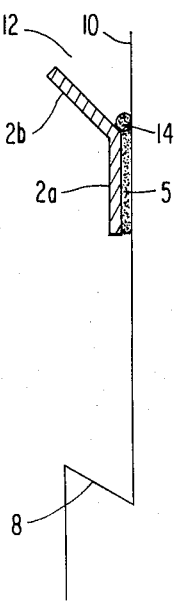
FIG. 4 is a vertical section of the device of the present invention in position on the tree trunk.

FIGS. 2, 3 and 4 illustrate implementation of the aluminum strip in accordance with the present invention on a Hevea tree. In accordance with rubber tapping techniques, one half-circumference (designated A in FIG. 3) of the tree is first exploited over a five year period and then the other half (B) of the tree is exploited. The bark of the tree 10 is brushed and the foil strip 2 is applied to the tapping site 8 at the position and inclination selected for the gutter. Where the aluminum strip is produced without adhesive, the portion of the trunk to which the strip is applied may be painted with an adhesive or latex. The lower part 2a of the strip 2 is fixed to the tree by pressing it closely to the trunk so that it adheres and assumes the contour of the tree surface. Then the upper half 2b of the strip is pulled back so as to form a channel 12 between the strip 2 and the trunk 10. Latex 14 may be poured into the bottom of the channel to perfect sealing. The gutter thus constructed is able to collect water 15 flowing down the trunk and direct it away from the slit 8 as shown in FIG. 3.

While the invention has been described in detail and with reference to specific embodiments thereof, it will be apparent to one skilled in the art that various changes and modifications can be made therein without departing from the spirit and scope thereof.

What is claimed is:

1. A method for protecting from rain water the extracts obtained by tapping trees, wherein a strip of aluminum foil in which aluminum strip folds, pleats or wrinkles are formed, is secured to the trunk of the tree above a tapping slit so as to form a gutter which diverts the rain water flowing down the trunk from the tapping slit.

2. The method of claim 1 wherein each end of the strip is folded back on itself prior to securing said strip to said tree.

3. The method of claim 1 wherein the portion of the trunk to which the aluminum strip is applied, is painted with an adhesive or latex.

4. The method of claim 1 wherein a pressure-sensitive adhesive is coated on one portion of one surface of the aluminum strip, prior to securing said strip, wherein said portion extends from one end of said surface to a point about one-third to about one-half of the width of said surface.

5. The method of claim 1 wherein one portion of one surface of the strip adheres to the tree trunk and the remainder of said surface of the strip is disposed away from the trunk and above said portion so that a channel is formed between the trunk and the strip.

6. The method of claim 1 wherein adhesive or latex is poured into the gutter to perfect the seal at the bottom of the channel.

7. A strip of aluminum foil having folds, wrinkles or pleats laterally formed therein and having on at least the lower one-third to one-half of one surface thereof a pressure-sensitive adhesive.

8. The aluminum foil strip of claim 7 wherein the surface of the foil opposite the adhesive bears a silicone or other release coating.

9. The aluminum foil strip of claim 7 wherein sufficient folds, pleats or wrinkles are present in the foil to provide about 25 to 50% elongation in length whenever a sufficient force is applied to the foil to expand said folds, pleats or wrinkles.

* * * * *